Patented Aug. 26, 1924.

1,506,202

UNITED STATES PATENT OFFICE.

HENRY L. PRESTHOLDT, OF MINNEAPOLIS, MINNESOTA.

CASEIN GLUE.

No Drawing. Application filed April 17, 1922. Serial No. 554,195.

*To all whom it may concern:*

Be it known that I, HENRY L. PRESTHOLDT, a citizen of the United States, residing at Minneapolis, in the county of Hennepin and State of Minnesota, have invented certain new and useful Improvements in Casein Glues; and I do hereby declare the following to be a full, clear, and exact description of the invention, such as will enable others skilled in the art to which it appertains to make and use the same.

My present invention provides a new composition of matter, herein designated as "casein glue," but which, from its broader aspect, is an adhesive composition adapted to be used, by itself or commingled with other substances, as an adhesive coating.

In this improved adhesive composition, casein is used as the main adhesive base and is commingled with dextrine, starch, calcium hydroxide, magnesium oxide and sodium hydroxide. In this composition, the dextrine, which is a converted starch, also has adhesive qualities. The starch is used to insure against the possibility of suphuric acid reactions.

I have obtained a very highly efficient glue or adhesive by the use of the above noted substances with the following formula:

|  | Parts. |
|---|---|
| Casein | 50 to 75 |
| Dextrine | 2 to 8 |
| Starch | 3 to 12 |
| Calcium hydroxide | 6 to 12 |
| Magnesium oxide | 10 to 20 |
| Sodium hydroxide | 2 to 8 |

The above noted substances are commingled in dry powdered form and are sold in this dry condition. When the adhesive is to be used, it will be introduced into water to form an emulsion and it is then, of course, that the chemical reactions that develop the adhesive qualities of the composition, will take place. After these chemical reactions have taken place, the emulsion is adapted to be used as a glue or as a coating or to be commingled with other substances such as paint or calcimine, which contain certain color pigments. When desired, however, the color-producing pigments may be commingled with the dry composition. When the composition is to be used simply as a glue, no additions to the formula given, except water, will be required.

Casein, dextrine, and starch provide the colloids. Calcium hydroxide in solution with casein forms a calcium caseinate, imparting waterproof qualities to the glue powder. Sodium hydroxide digests the starch and is a casein solvent. The hydroxide of soda, in combination with calcium hydroxide, would effect the solution of the glue powder, but it would quickly become gelatinous and set up. Magnesium oxide is introduced for the purpose of retarding this process, which it does and imparts to the glue solution a liquid life of several hours.

What I claim is:

1. An adhesive composition comprising a mixture of casein, dextrine, starch, calcium hydroxide, magnesium oxide and sodium hydroxide.

2. An adhesive composition made in accordance with the following formula:

|  | Parts. |
|---|---|
| Casein | 50 to 75 |
| Dextrine | 2 to 8 |
| Starch | 3 to 12 |
| Calcium hydroxide | 6 to 12 |
| Magnesium oxide | 10 to 20 |
| Sodium hydroxide | 2 to 8 |

In testimony whereof I affix my signature.

HENRY L. PRESTHOLDT.